United States Patent [19]

Schwab et al.

[11] Patent Number: 4,837,413

[45] Date of Patent: Jun. 6, 1989

[54] ROTARY SWITCH

[75] Inventors: Günter Schwab, Pforzheim; Helmut Reiber, Neulingen; Rolf Stapelfeldt, Remchingen, all of Fed. Rep. of Germany

[73] Assignee: Standard Elektrik Lorenz Aktiengesellschaft, Stuttgart, Fed. Rep. of Germany

[21] Appl. No.: 113,314

[22] Filed: Oct. 28, 1987

[30] Foreign Application Priority Data

Oct. 28, 1986 [DE] Fed. Rep. of Germany ....... 3636575

[51] Int. Cl.[4] ..................... H01H 19/06; H01H 9/04; H02B 1/04

[52] U.S. Cl. .............................. 200/11 R; 200/11 G; 200/11 K; 200/302.1

[58] Field of Search ................ 200/11 R, 11 A, 11 D, 200/11 DA, 11 G, 11 J, 11 K, 11 TW, 155 R, 155 A, 302.1, 295, 296

[56] References Cited

U.S. PATENT DOCUMENTS

| | | | |
|---|---|---|---|
| 3,300,594 | 1/1967 | Paine et al. | 200/11 G |
| 3,311,718 | 3/1967 | Allison et al. | 200/11 K |
| 3,736,390 | 5/1973 | Lockard | 200/11 G X |
| 4,490,588 | 12/1984 | Guenther et al. | 200/11 R |

FOREIGN PATENT DOCUMENTS

| | | |
|---|---|---|
| 2356500 | 5/1975 | Fed. Rep. of Germany . |
| 2659084 | 10/1978 | Fed. Rep. of Germany . |

*Primary Examiner*—J. R. Scott
*Assistant Examiner*—a
*Attorney, Agent, or Firm*—Spencer & Frank

[57] ABSTRACT

A rotary switch, adapted to be secured to a panel, comprises a stator having a bearing flange provided with a cylindrical side wall and an underside; a circumferential groove provided in the side wall and an annular groove provided in the underside; and a rotor extending over the bearing flange and having a cylindrical side wall surrounding the cylindrical side wall of the bearing flange. The rotor is rotatably supported on and relative to the stator. There are further provided a stationary contact mounted in the stator; a movable contact carried by the rotor for displacement relative to the stationary contact upon turning of the rotor; and a first sealing ring received in the circumferential groove and projecting radially outwardly from the cylindrical side wall of the bearing flange. The first sealing ring sealingly and slidably engages the cylindrical side wall of the rotor. The rotary switch further has a second sealing ring received in the annular groove and projecting outwardly from the underside of the bearing flange.

19 Claims, 3 Drawing Sheets

ROTARY SWITCH

BACKGROUND OF THE INVENTION

The present invention relates to a rotary switch insertable into a printed circuit board or a front panel. The rotary switch has a stator provided with stationary contact terminals at its underside and the associated stationary terminals at the inside and further has a rotor shaped as a cap-like operating knob surrounding the stator.

Such rotary switches are known as knob-operated rotary switches. Their construction is similar to that disclosed in German Auslegeschrift (published examined patent application) 26 59 084 or German Offenlegungsschrift (published non-examined application) 23 56 500. There, however, the knob lies on the stator, which has a larger diameter, while in the case of the knob operated rotary switches, the knob covers the stator, which has a slightly smaller diameter, at the sides as well.

SUMMARY OF THE INVENTION

The object of the present invention is to design a knob-operated rotary switch in such a manner that it is water-tight, particularly pressure-water-tight. This object and others to become apparent as the specification progresses, are accomplished by the invention, according to which, briefly stated, the rotary switch, adapted to be secured to a panel, comprises a stator having a bearing flange provided with a cylindrical side wall and an underside; a circumferential groove provided in the side wall and an annular groove provided in the underside; and a rotor extending over the bearing flange and having a cylindrical side wall surrounding the cylindrical side wall of the bearing flange. The rotor is rotatably supported on and relative to the stator. There are further provided a stationary contact mounted in the stator; a moveable contact carried by the rotor for displacement relative to the stationary contact upon turning of the rotor; and a first sealing ring received in the circumferential groove and projecting radially outwardly from the cylindrical side wall of the bearing flange. The first sealing ring sealingly and slidably engages the cylindrical side wall of the rotor. The rotary switch further has a second sealing ring received in the annular groove and projecting outwardly from the underside of the bearing flange. The invention not only permits a watertight design of the switch but also prevents the ingress of water between the switch and the mounting plate so that water cannot penetrate into a device via the switch.

DESCRIPTION OF THE PREFERRED EMBODIMENTS

Figure 1:
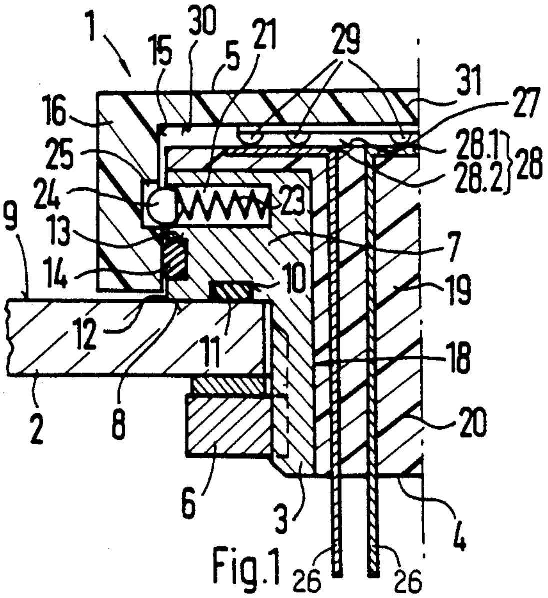
FIG. 1 is a sectional side view of one half of a rotary switch according to a preferred embodiment of the invention.

Reference numeral 1 designates a rotary switch. It has a stator 4 and a rotor 5 covering the stator 4 like a cup. The stator 4 has a disk-shaped bearing flange 7 and a shank 3. Appropriately, the shank 3 is designed as a threaded sleeve which can be inserted into a front panel 2 of a pressure-water-tight device and can be screwed to the front panel by means of a nut 6 so that the underside 8 lies on the top side 9 of the front panel. The rotor 5 is designed as a knob.

On the underside 8 of the bearing flange 7 is an annular groove 10 containing an elastic seal ring 11 which projects from the underside 8 and which, when the nut 6 is tightened, seals the area between the stator 4 and the front panel 2 against the ingress of water, particularly high-pressure water.

In the circumferential wall 12 of the bearing flange 7, a circumferential groove 13 is provided into which an elastic seal ring 14 has also been inserted. The elastic seal ring 14 projects from the circumferential wall 12. The distance between the inside wall 15 of the sidewall 16 of the rotor 5 and the circumferential wall 12 of the bearing flange 7 is so small that the inside wall 15 presses against the seal ring 14, thus providing a seal against the ingress of pressurized water between the inside wall 15 and the circumferential wall 12. When the rotor 5 is rotated, the inside wall 15 slides on the seal ring 14. Advantageously, a lubricant is provided between the inside wall 15 and the seal ring 14. By the two seal rings 11 and 14, the switch is sealed off, and a seal is also provided between the switch and the inside of a device.

For increased stability, the shank 3 and the bearing flange 7 may be made of metal. The shank 3 has a bore 18 into which the shaft 20 of a mushroom-shaped contact support 19 of insulating material is inserted. The stator 4 is fastened to the shaft 20 by screwing, adhesive bonding, pressing or shrinking, such that a pressure-water-tight connection is obtained.

Figure 2:
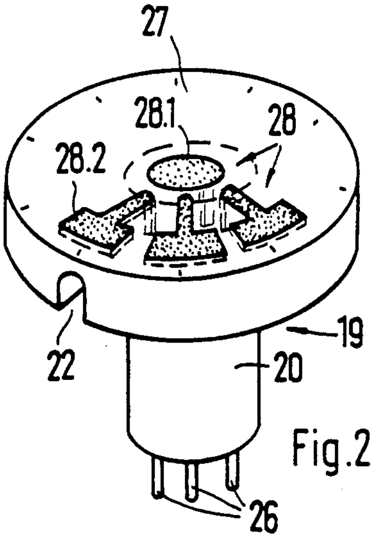
FIG. 2 is a perspective view of the stator of FIG. 1.
Figure 5:
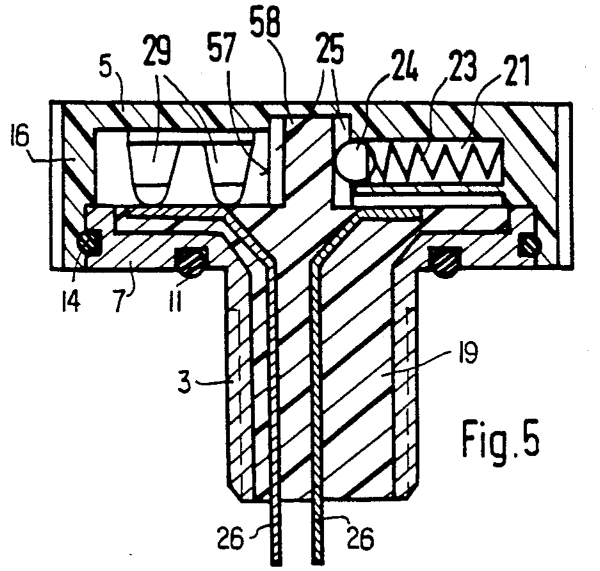
FIG. 5 is a sectional side view of a switch with a different detent mechanism.

The stator 4 has a transverse bore 21 (FIG. 1) or a groove 22 (FIG. 2) which, in the case of a two-piece design, is provided either in the bearing flange 7 or in the insulating contact support 19, and in which a compression spring 23 and an indexing ball 24 are guided. The indexing ball 24 moves into engagement with a ball-detent portion 25 on the inside wall 15 of the sidewall 16 of the rotor 5 in a known manner. The transverse bore 21 or the groove 22 may also be provided in the rotor 5 and the indexing ball 24 can then press against the front wall 57 of a stator portion 58 which supports a ball-detent portion 25 as shown in FIG. 5.

If the stator 4 is made of insulating material or if an insulating contact support 19 is used, fixed-contact terminals 26 are molded into the shank 3 or the shaft 20, respectively, which are connected to fixed contacts 28 accessible at the surface 27, or the fixed-contact terminals 26 and the fixed contacts 28 are molded in as an angular unit.

The movable contacts 29 are fixed to the inside 30 of the rotor top portion 31 and may, for example connect a center contact 28.1 with an outer contact 28.2.

Figure 3:
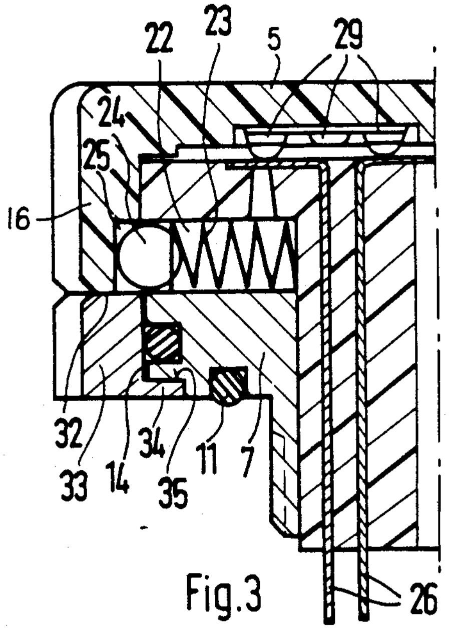
FIG. 3 is a sectional side view of another preferred embodiment with a holding member for the knob.
Figure 4:
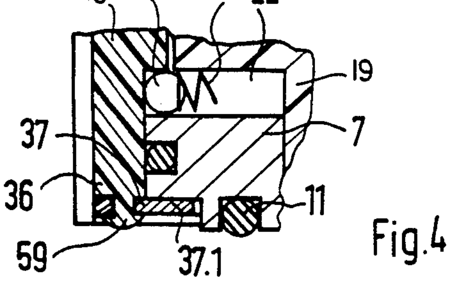
FIG. 4 is a sectional side view of a part of a variant of the holding member for the knob.

As shown in FIG. 3, to the rotor 5 there attached is a ring 33 having an inwardly extending annular flange 34 which slides on the bearing flange 7. The ring 33 is secured by adhesive bonding to the lower rim 32 of the sidewall 16. The annular flange 34 engages an annular recess 35 in the bearing flange 7. Instead of attaching the ring 33 by adhesive bonding, the annular flange 34 may be formed by bending a projecting rim of the sidewall 16 of the rotor 5 inwardly by a hot-working process. Furthermore, instead of the ring 33 or the projecting portion of the rim 36 of the rotor 5, as shown in FIG. 4, a retaining ring disk 37 may be attached, e.g., by hot-working projecting rim portions 59. The retaining ring disk 37 may be designed to advantage as a coding disk by being provided with at least one stop which can cooperate with at least one counter-stop of the bearing flange 7.

Figure 6:
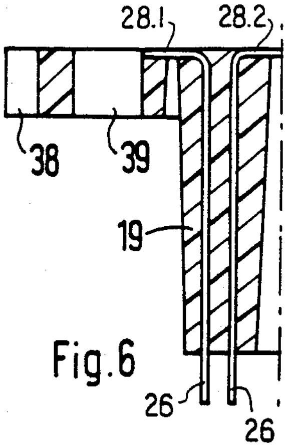
FIG. 6 is a sectional side view of an embodiment of the rotor locking mechanism.
Figure 7:
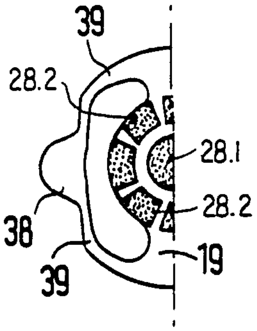
FIGS. 7 and 8 are top plan views of the structure of FIG. 6.
Figure 8:
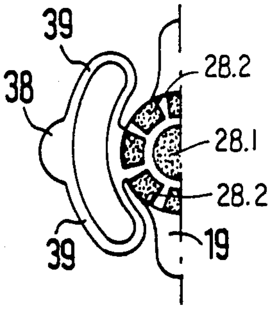

In the preferred embodiment of the invention shown in FIGS. 6 to 8, instead of using an indexing ball 24, a detent cam 38 can be formed on the contact support 19, or on the rotor 5, by means of at least one resilient intermediate portion 39.

Figure 9:
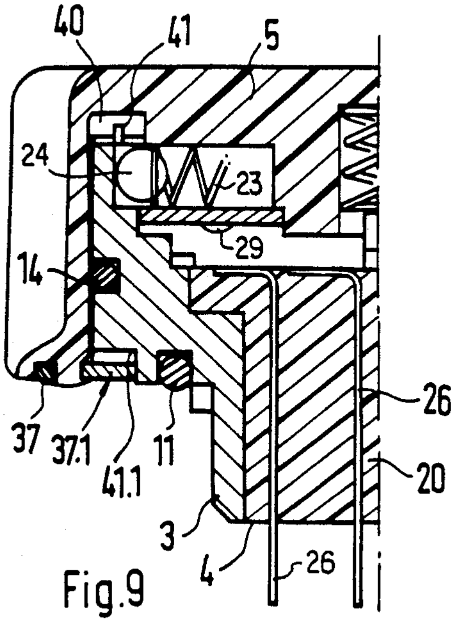
FIG. 9 is a sectional side view of a further embodiment with a holding rim designed as an encoder.
Figure 10:
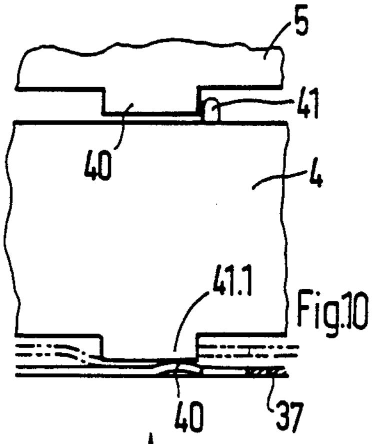
FIG. 10 is an elevational view of one part of FIG. 9.
Figure 11:
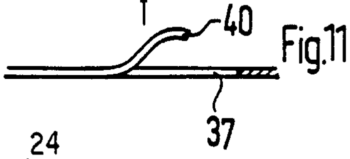
FIG. 11 is an elevational view of one part of FIG. 10.

In FIGS. 9 to 11, a switch is shown in which the retaining ring disk 37 is designed as a coding disk, and the rotor 5 can be lifted from the stator by a short distance. During the pulling action, a stop 40 of the rotor 5 can disengage a shoulder 41 of the stator 4, so that the rotor 5 can still be rotated when, after the rotor 5 was lifted, the stop has been overcome. In the alternative, the stop 40 may be provided at the retaining ring disk 37. In that case, the stator 4 has a shoulder 41.1 in the area of the stop 40.

Figure 12:
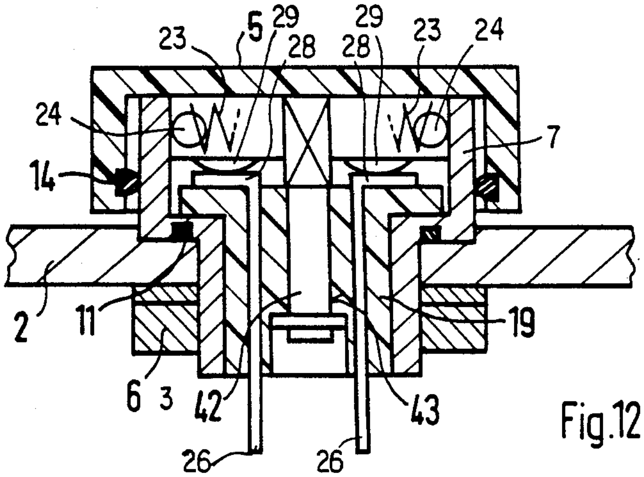
FIG. 12 is a sectional side view of an embodiment of the knob mounting.
Figure 13:
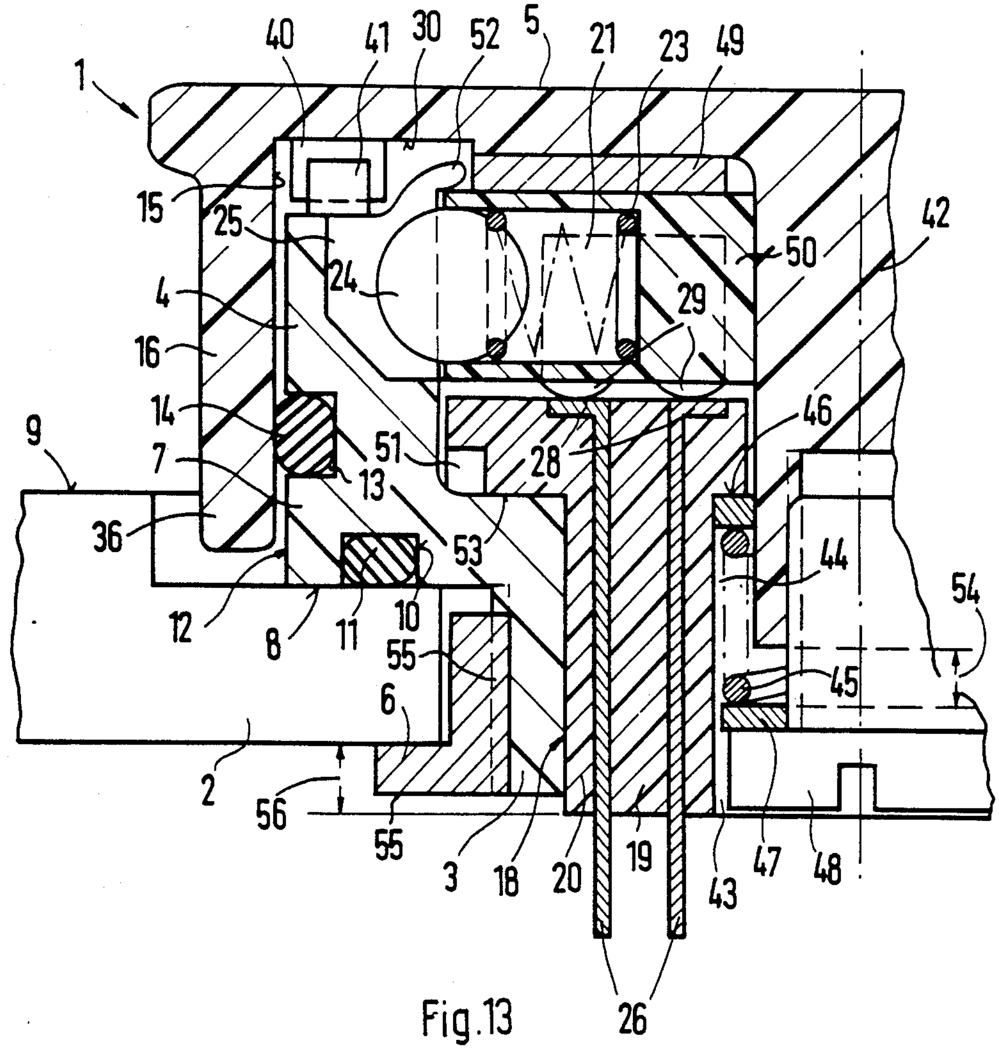
FIG. 13 is a sectional side view of a preferred embodiment showing a combined rotary and pull switch.

As shown in FIG. 12, the rotor 5 can also be fixed by means of a shaft 42 formed on the rotor, the shaft being passed through a bore 43 of the contact support 19 from one side and screwed on the other side. In this manner, a combined pull and rotary switch which is sealed against the ingress of pressurized water is obtained. In FIG. 13, the bore 43 in the contact support 19 has a widening 44 for inserting a compression spring 45 which is mounted between the stator stop 46 and a washer 47. The latter is fixed by a screw 48 which can be screwed into the shaft 42 from below.

A rotor head 50 is connected to the rotor 5, if necessary with a spring disk or a sliding disk 49 as an intermediate layer, providing a positive connection for rotary motions and a sliding fit for axial motions (pull) of the rotor 5. As the rotor 5 is pulled up by the distance 54, a shoulder 41 (as shown in FIGS. 10 and 11) of the stator 4, which limits the rotary motion of the rotor 5, can be cleared, so that the rotor can be rotated further. When the rotor 5 is pulled up, the rotor head 50 is held by the deformed segments 52 of the stator 4. The rotor head 50 contains the movable contacts 29, which are pressed against the fixed contacts 28 by springs and are designed as a rocker. The contact support 19 is fixed in position relative to the stator 4 via a nose 51 and is fastened through its shaft 20 in the area of the bore 18 and/or in the area of the bearing surface 53, preferably by adhesive bonding or pressing, in a water-tight manner. To minimize the extent of projection 56 from the inside edge of the front panel 2, a large part of the thread-overlapping area 55 of the nut 6 required for securing the switch can be accommodated within the thickness of the front panel 2.

In case of a rotor 5 which can be lifted by the distance 54, the rim 36 of its sidewall extends downward far enough to cover the seal ring 14 even in the lifted state of the rotor 5.

We claim:

1. A rotary switch adapted to be secured to a panel, comprising (a) a stator having a bearing flange provided with a cylindrical side wall and an underside; a circumferential groove provided in said side wall and an annular groove provided in said underside;

(b) a rotor extending over said bearing flange and having a cylindrical side wall surrounding the cylindrical side wall of said bearing flange; said rotor being rotatably supported on and relative to said stator;

(c) stationary contacts mounted in said stator;

(d) a movable contact carried by said rotor for displacement relative to said stationary contacts upon turning of said rotor;

(e) a first sealing ring received in said circumferential groove and projecting radially outwardly from said cylindrical side wall of said bearing flange; said first sealing ring sealingly and slidably engaging said cylindrical side wall of said rotor; and (f) a second sealing ring received in said annular groove and projecting outwardly from said underside of said bearing flange.

2. A rotary switch as defined in claim 1, further comprising (g) means defining a recess in said stator;

(h) a spring accommodated in said recess;

(i) an indexing ball urged by said spring outwardly of said stator and into engagement with said cylindrical side wall of said rotor; and (j) ball-detent portions provided in said cylindrical side wall of said rotor; said ball-detent portions being adapted to be individually brought into alignment with said indexing ball upon turning said rotor; said ball-detent portions being dimensioned to at least partially receive said indexing ball when aligned therewith.

3. A rotary switch as defined in claim 1, further comprising (g) means defining a recess in said rotor;

(h) a spring accommodated in said recess;

(i) an indexing ball urged by said spring outwardly of said rotor and into engagement with said stator; and (j) ball-detent portions provided in said stator; said ball-detent portions being adapted to be individually brought into alignment with said indexing ball upon turning said rotor; said ball-detent portions being dimensioned such as to at least partially receive said indexing ball when aligned therewith.

4. A rotary switch as defined in claim 1, wherein said rotor has a top portion connected to said cylindrical side wall of said rotor and extending over said bearing flange; said top portion having an underside to which said movable contact is fastened.

5. A rotary switch as defined in claim 1, wherein said cylindrical side wall of said rotor has a radially inwardly extending rim slidingly engaging an annular marginal part of the underside of said bearing flange.

6. A rotary switch as defined in claim 1, further comprising (g) a detent cam attached by a resilient member to said rotor; said resilient member urging said detent cam away from said rotor and into engagement with said stator; and (h) detent recesses provided in said stator; said detent recesses being adapted to be individually brought into alignment with said detent cam upon turning said rotor; said detent recesses being dimensioned such as to at least partially receive said detent cam when aligned therewith.

7. A rotary switch as defined in claim 1, further comprising a nose means for immobilizing a contact support of said stator relative to said bearing flange.

8. A rotary switch as defined in claim 1, wherein said stator has a threaded portion adapted to project beyond the panel and a nut threadedly engageable with said threaded portion for tightening the stator to the panel.

9. A rotary switch as defined in claim 1, further comprising a retaining ring disc secured to a lower portion of said cylindrical side wall of said rotor; said retaining ring disc extending radially inwardly and slidingly engaging an annular marginal part of the underside of said bearing flange.

10. A rotary switch as defined in claim 9, wherein said retaining ring disc has at least one stop and said bearing flange has at least one counterstop cooperating with the stop of said bearing flange.

11. A rotary switch as defined in claim 1, wherein said rotor has a rotor shaft rotatably and axially slidably held in said stator; said rotor having a rotor head carrying said movable contact; said rotor shaft being torque-transmittingly and axially slidably connected to said rotor head.

12. A rotory switch as defined in claim 11, further wherein said stator has deformed segments extending radially over said stator head for preventing axial displacement thereof upon axial movement of said rotor shaft.

13. A rotary switch as defined in claim 1, further comprising support means for axially movably supporting said rotor on said stator.

14. A rotary switch as defined in claim 13, further comprising abutting means for limiting the rotation of said rotor relative to said stator in a normal axial position of said rotor; said abutting means being arranged such as to be cleared for additional rotation by said rotor upon axial movement thereof.

15. A rotary switch as defined in claim 13, wherein said support means comprises a spring axially urging said rotor towards said stator and limit means for allowing a limited axial displacement of said rotor away from said stator against the force exerted by said spring.

16. A rotary switch as defined in claim 1, wherein said stator further comprises a hollow shank portion forming an axial continuation of said bearing flange; a shaft surrounded by said hollow shank portion and having a disc-shaped contact support of insulating material; said stationary contacts being mounted on said disc-shaped contact support; said shank being in a watertight contact with said shaft.

17. A rotary switch as defined in claim 16, wherein said shank and said bearing flange are made of metal.

18. A rotary switch as defined in claim 16, wherein said shank and said shaft are bonded to one another by an adhesive.

19. A rotary switch as defined in claim 16, further comprising a detent cam attached by a resilient member to said disc-shaped contact support; said resilient member urging said detent cam away from said stator and into engagement with said cylindrical side wall of said rotor; and detent recesses provided in said cylindrical side wall of said rotor; said detent recesses being adapted to be individually brought into alignment with said detent cam upon turning said rotor; said detent recesses being dimensioned to at least partially receive said detent cam when aligned therewith.

* * * * *